United States Patent [19]

Pandolfino, Jr.

[11] Patent Number: 4,826,307

[45] Date of Patent: May 2, 1989

[54] FREE-STANDING SPECTACLES WITH MIRROR

[76] Inventor: Joseph Pandolfino, Jr., 203 Colvin Ave., Buffalo, N.Y. 14216

[21] Appl. No.: 156,310

[22] Filed: Feb. 16, 1988

[51] Int. Cl.⁴ .............................................. G02C 1/00
[52] U.S. Cl. ...................................... 351/41; 351/158; 350/600
[58] Field of Search ................. 350/446, 600; 351/41, 351/223, 158

[56] References Cited

U.S. PATENT DOCUMENTS 3,996,947 12/1976 Szpur et al. ......................... 350/446

Primary Examiner—Rodney B. Bovernick

[57] ABSTRACT

Free-standing, prescription, convex lens spectacles are mounted in front of a swivel mirror which benefits people with the eye condition hypermetropia or farsightedness. The free-standing lenses are rimless and are connected to L-shaped arms which are attached to the frame of the swivel mirror. The lenses are adjusted by an optometrist, along with the L-shaped arms to custom fit each individual. The farsighted person looks at the mirror through the lenses. One can now use two hands to apply cosmetics to eyes and face, or to attend to eyes and face without image being blurred, and by not having conventional spectacles on the face to only get in the way.

3 Claims, 2 Drawing Sheets

FREE-STANDING SPECTACLES WITH MIRROR

TECHNICAL FIELD

This invention relates to optometry.

BACKGROUND ART

People who have the eye condition of farsightedness have trouble when looking into a mirror and wanting to use two hands and attend to their eyes and other facial parts. The reason for this is that their spectacles are in the way. When a farsighted person takes his spectacles off in this situation, he is then faced with a blurred image of himself.

SUMMARY OF THE INVENTION

It is accordingly an object of the present invention to provide free-standing prescription spectacles in front of a mirror to solve the problem a farsighted person faces. The invention provides for one (particularly women applying make-up to their eyes and face) to attend to his or her face, while still using two hands, without the bother of having spectacles preventing easy access.

The user of the invention simply looks through the free-standing lenses and now can easily attend to the eyes or face with a crystal clear image.

BEST MODE FOR CARRYING OUT THE INVENTION

Figure 1:
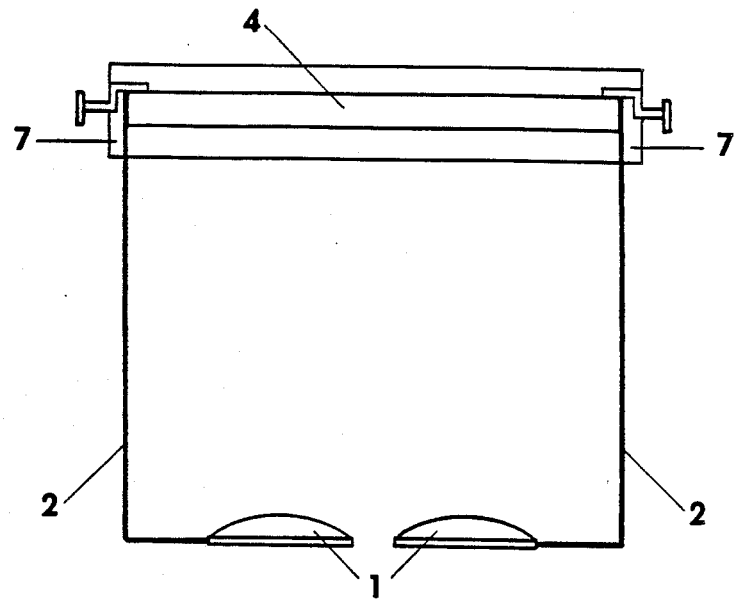
FIG. 1 is the top view of the free-standing spectacles with mirror. The L-shaped arms are shown well.
Figure 2:
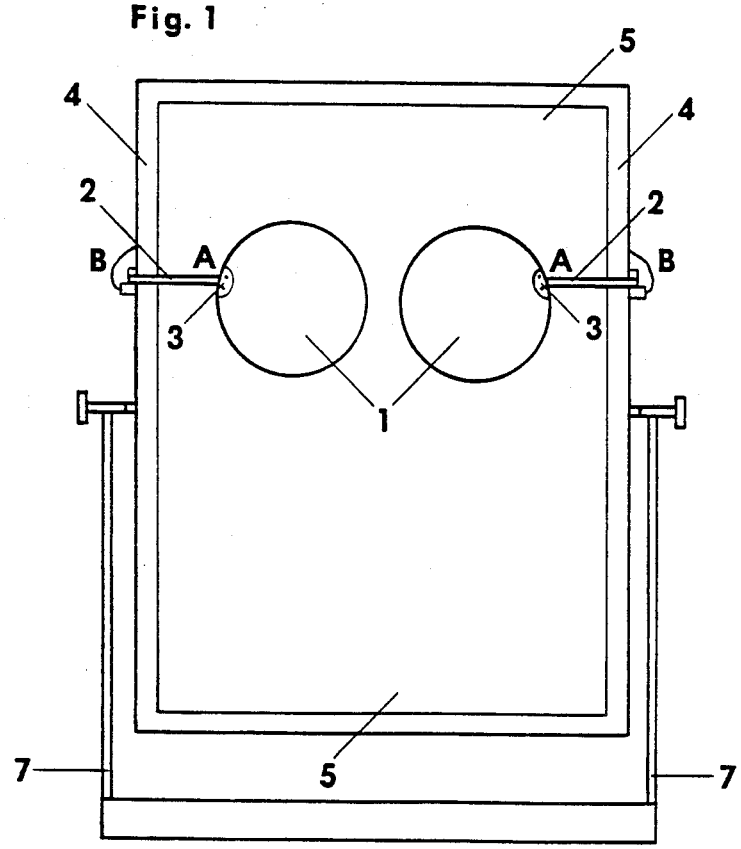
FIG. 2 is the front view of the invention. The user looks through these spectacles 1.

The presciption lenses are mounted to the L-shaped arms 2 which are metal. Rims are not used because they would block part of the reflection on the mirror. The lenses are mounted to the L-shaped arms with screws 3 in the same way as conventional rimless spectacles are mounted to frames. (Plastic lenses are usually used for rimless spectacles).

The L-shaped arms are connected to the frame 4 of the swivel mirror 5 with one screw 6 for each arm as in the drawings. This one screw allows the L-shaped arms to be lowered and raised. An insertable pin holds up each L-shaped arm. The screws are heavy-duty since none of the weight of the lenses and L-shaped arms falls on the nose as in conventional spectacles. This is done by the invention so none of the face is blocked as it would be if there was a bridge for the nose. Also, this makes the user of the invention free to move his head without the spectacles moving.

The length of line AB is not fixed. This length, along with the correct angle of the lenses to custom fit the individual is determined by the optometrist. These adjustments are done by the same conventional methods that frames of current spectacles are adjusted and bent. The length of line AB thus determines how close the lenses are to each other for a custom "fit". The distance of line BC can be varied as to preference, but is usually five to nine inches.

The swivel mirror is fastened to a metal stand 7 with screws so the invention easily stands on a table or other flat surface. The stand can easily be removed if the user of the invention wishes to use the two wall brackets on the back of the mirror to hang the invention on a wall.

Figure 3:
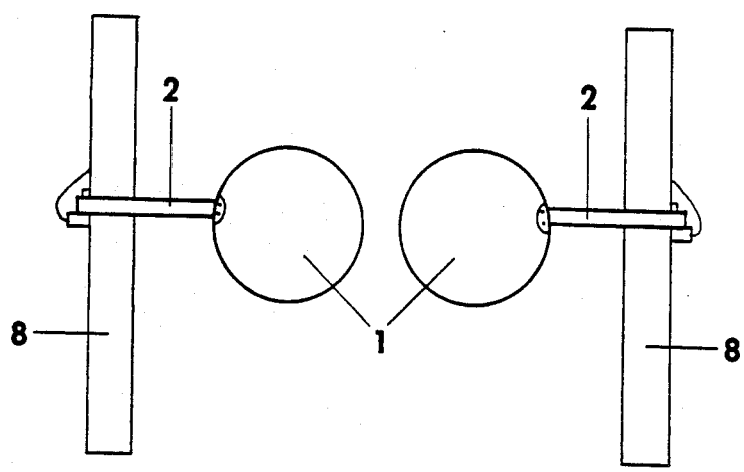
FIG. 3 is a front view showing the invention with mirror mounts 8. This is done when the free-standing spectacles are mounted to a separate mirror.
Figure 4:
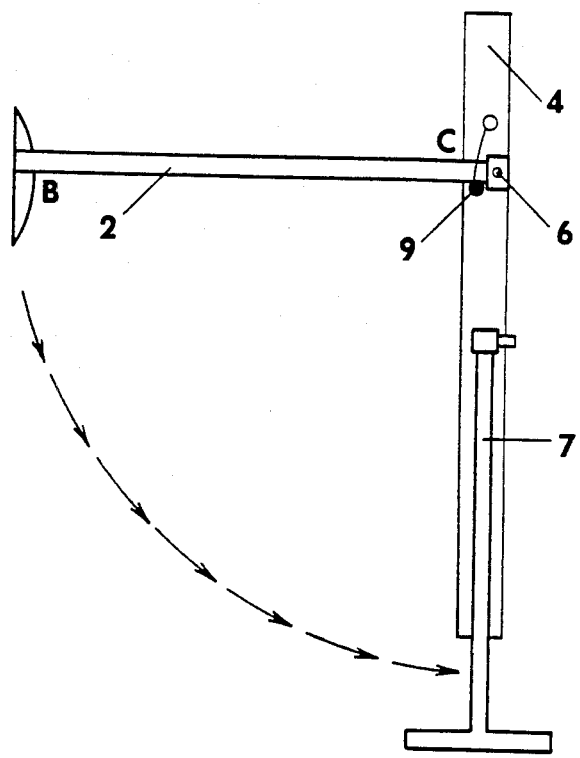
FIG. 4 is the side view of the invention. It shows how the L-shaped arms come down. Notice the single screw 6, and the hanging pin 9 which keeps the arm up. There is one pin on each side.

The mirror is an option of the invention. The free-standing spectacles with mirror mounts can easily be attached to an existing mirror with special glass cement. In this case, the L-shaped arms are screwed into hard plastic strips (mirror mounts) 8 as in FIG. 3. The mirror mounts are one inch wide across, two inches deep, and six inches high.

The mirror with free-standing spectacles comes in any size. Compact sizes which will fit in a woman's purse are the same as above with some exceptions. The mirror is obviously smaller, and there is a petite stand, but no wall brackets or mirror mounts. Also the distance from the spectacles to the mirror, line BC, is reduced.

A hard plastic cause used to store the compact free-standing spectacles with mirror.

The mirror used with the free-standing spectacles can be concave or convex.

I claim:

1. Free-standing spectacles with swivel mirror, The invention comprising: two prescription convex lenses, each separated from the other, each lens being fastened by a L-shaped arm which is connected to the frame of the swivel mirror, the L-shaped arms being able to slide up and down the mirror and being secured in a raised position with a pin so that when each pin is removed, each arm slides down independently so the free-standing spectacles with mirror is flat and can be stored easily and be portable, the mirror being a compact swivel mirror with a frame located directly behind the lenses which connects to the L-shaped arms, in which the mirror and spectacles are connected to a stand for purpose of allowing a farsighted person to use hands to apply cosmetics or attend to his or face, and to be able to do so easily without his or her conventional spectacles getting in the way, and yet being able to do so with the best attainable vision.

2. Free-standing spectacles as in claim 1 wherein mirror mounts are used with free-standing spectacles in conjunction with a mirror separate from invention.

3. Free-standing spectacles with mirror as in claim 1 wherein a concave mirror or a convex mirror is used.

* * * * *